(12) United States Patent
Zhang et al.

(10) Patent No.: US 11,778,042 B2
(45) Date of Patent: Oct. 3, 2023

(54) SYSTEM AND METHOD FOR DOWNLOADING APPLICATION PROGRAM OF INDUSTRIAL ELECTRIC VEHICLE DRIVER

(71) Applicant: MACHINERY TECHNOLOGY DEVELOPMENT CO., LTD, Beijing (CN)

(72) Inventors: Sheng Zhang, Beijing (CN); Hao Chen, Beijing (CN); Jianning Gong, Beijing (CN); Xun Hao, Beijing (CN); Huan Ma, Beijing (CN); Haidong Ji, Beijing (CN); Yuntong Wang, Beijing (CN)

(73) Assignee: MACHINERY TECHNOLOGY DEVELOPMENT CO., LTD, Beijing (CN)

( * ) Notice: Subject to any disclaimer, the term of this patent is extended or adjusted under 35 U.S.C. 154(b) by 0 days.

(21) Appl. No.: 17/964,066

(22) Filed: Oct. 12, 2022

(65) Prior Publication Data

US 2023/0199072 A1    Jun. 22, 2023

(51) Int. Cl.
*H04L 67/141* (2022.01)
*H04L 12/40* (2006.01)

(52) U.S. Cl.
CPC .......... *H04L 67/141* (2013.01); *H04L 12/40* (2013.01); *H04L 2012/40215* (2013.01); *H04L 2012/40273* (2013.01)

(58) Field of Classification Search
CPC .................. H04L 67/141; H04L 12/40; H04L 2012/40215; H04L 2012/40273

(Continued)

(56) References Cited

U.S. PATENT DOCUMENTS

2018/0102939 A1* 4/2018 Kim .................. H04L 12/40169

FOREIGN PATENT DOCUMENTS

CN    105426198 A    3/2016
CN    107346244 A    11/2017
(Continued)

OTHER PUBLICATIONS

Kornaros et al, "Towards holistic secure networking in connected vehicles through securing CAN-bus communication and firmware-over-the-air updating", 2020, [Online], pp. 1-13, [Retrieved from interneton May 8, 2023], <https://www.sciencedirect.com/science/article/pii/S1383762120300552> (Year: 2020).*

(Continued)

*Primary Examiner* — S. Sough
*Assistant Examiner* — Zengpu Wei
(74) *Attorney, Agent, or Firm* — Bayramoglu Law Offices LLC

(57) ABSTRACT

A system and a method for downloading an application program of an industrial electric vehicle driver are provided. The system includes a downloader, a USB/CAN bus converter and a plurality of drivers. The system is capable of implementing concurrent simultaneous downloads of driver application programs in an online multi-channel and multi-node per channel manner. The downloader and the fully automatic downloading method help to improve the quality of the products leaving the factory and maintain the consistency of the products, thereby not only greatly enhancing product production efficiency and customer satisfaction, but also greatly reducing labor intensity, with significant economic and social benefits.

15 Claims, 4 Drawing Sheets

(58) Field of Classification Search
USPC .............................................. 701/1
See application file for complete search history.

(56) References Cited

FOREIGN PATENT DOCUMENTS

| | | |
|---|---|---|
| CN | 107832076 A | 3/2018 |
| CN | 207516996 U | 6/2018 |
| CN | 108628624 A | 10/2018 |
| WO | 2020148746 A1 | 7/2020 |

OTHER PUBLICATIONS

Cheng Yan, Design of Can Control System Based on USB Interface, Southwest Jiaotong University Master's Degree Thesis, 2005, pp. 1-64.

* cited by examiner

SYSTEM AND METHOD FOR DOWNLOADING APPLICATION PROGRAM OF INDUSTRIAL ELECTRIC VEHICLE DRIVER

CROSS-REFERENCE TO THE RELATED APPLICATIONS

This application is based upon and claims priority to Chinese Patent Application No. 202111547937.7, filed on Dec. 17, 2021, the entire contents of which are incorporated herein by reference.

TECHNICAL FIELD

The present application relates to the technical field of industrial electric vehicle drivers, and in particular, to a system and a method for downloading application program of industrial electric vehicle driver.

BACKGROUND

Industrial electric vehicles, such as counterbalanced forklifts, pallet trucks, tractors, AGVs (Automated Guided Vehicles) and sightseeing vehicles, have driving units (i.e., drivers) that are mainly used to drive and control high/low voltage AC electric vehicles. By virtue of a drive load from 1 ton to 25 tons, the driver has a wide range of applications and is in high demand. Under normal circumstances, after the driver is produced and assembled according to a user's order, it is necessary to manually download application programs of the industrial electric vehicle drivers one by one before leaving the factory, which results in not only a huge workload, but also problems such as low download efficiency, omitting downloading programs, and downloading wrong programs, causing immeasurable losses to manufacturers and end customers. Therefore, there is an urgent need to develop an automatic download system for drive application programs of industrial electric vehicles.

SUMMARY

An objective of the present application is to provide a system and a method for downloading application program of industrial electric vehicle driver, so as to solve the problems when using manual program download in the related art such as low download efficiency, omitting downloading programs or downloading wrong programs, causing immeasurable losses to manufacturers and end customers.

In order to achieve the objective, in a first aspect of the present application, provided herein is a system for downloading application program of industrial electric vehicle driver, including: a downloader, a USB/CAN bus converter and a plurality of drivers; where the downloader is connected to a production execution system and the USB/CAN bus converter, respectively, the USB/CAN bus converter has a plurality of CAN bus channels, each of the CAN bus channels includes a plurality of nodes, and each of the nodes is provided with the driver.

The downloader is configured to sequentially scan the drivers on each node under all CAN bus channels of the USB/CAN bus converter, and obtain a serial number stored in each of the drivers; automatically match an application program file from the production execution system according to the serial number of the driver; load the application program file and extract application program data from the application program file; create and issue a first command data frame of data domain process to a driver, and initialize a download identification; create and issue a second command data frame of upload/download mode to a driver; create and issue a third command data frame of data address record to a driver; create a fourth data frame of application program; create and issue a fifth command data frame of ending data frame to a driver when the application program is downloaded completely; create and issue a sixth command data frame of ending data domain process to a driver, and reset the download identification; and create and issue a seventh command data frame of restarting node to a driver to allow the downloaded application program in the driver to take effect.

In an embodiment, the USB/CAN bus converter has 2 to 4 CAN bus channels.

In an embodiment, each of the CAN bus channels includes 2 to 32 nodes.

In an embodiment, the driver supports CAN and CAN-OPEN protocols in terms of communication protocols.

In an embodiment, the driver has a voltage level of 24V to 84V.

In an embodiment, the application program file contains XML format data and binary format data.

In a second aspect of the present application, provided herein is a method for downloading application program of industrial electric vehicle driver, performed by the system for downloading application program of industrial electric vehicle driver, including:

step 1, the downloader sequentially scanning the drivers on each node under all CAN bus channels of the USB/CAN bus converter, and obtaining the serial number stored in each of the drivers;

step 2, the downloader automatically matching the application program file from the production execution system according to the serial number of the driver;

step 3, the downloader loading the application program file and extracting application program data from the application program file;

step 4, the downloader creating and issuing the first command data frame of data domain process to a driver, and initializing the download identification;

step 5, the downloader creating and issuing the second command data frame of upload/download mode to a driver;

step 6, the downloader creating and issuing the third command data frame of data address record to a driver;

step 7, the downloader creating the fourth data frame of application program, where a first byte in the fourth data frame of application program is a command identification, a second byte identifies a current process, a third byte identifies a serial number for downloading a current data frame, and last 5 bytes store application program data;

step 8, the downloader creating and issuing the fifth command data frame of ending data frame to a driver when the application program is downloaded completely;

step 9, the downloader creating and issuing the sixth command data frame of ending data domain process to a driver, and resetting the download identification; and step 10, the downloader creating and issuing the seventh command data frame of restarting node to a driver to allow the downloaded application program in the driver to take effect.

In an embodiment, the step 1 further includes: the downloader associating the obtained serial number with a production order issued by the production execution system, and automatically or manually selecting a node and a baud rate at which communication can be established, so as to obtain information stored in the driver, where the information stored in the driver includes firmware program, startup program, serial number, model and material code feature information.

In an embodiment, the step 2 further includes: the downloader automatically matching the corresponding application program file from the production execution system by means of a database intermediate table or a WebService/WebAPI interface.

In an embodiment, the step 3 further includes: the downloader extracting application program data in binary format from the application program file, parsing the application program data in binary format and removing invalid verification data, and saving processed data to a temporary memory in the downloader.

The present application has the following beneficial effects:

(1) In the system and method for downloading application program of industrial electric vehicle driver of the present application, the application program file can be loaded at one time and then can be downloaded repeatedly to various drivers; in addition, for a single driver, and the integrity and correctness of the data in the downloading process are ensured by independently creating the data domain process and synchronously and concurrently issuing the number of data frames, data length and relative start address, respectively, thereby overcoming the technical defects of low efficiency in the related art, in which the download is performed one-by-one serially.

(2) The downloader and the fully automatic downloading method of the present application help to improve the quality of the products leaving the factory and maintain the consistency of the products, thereby not only greatly enhancing product production efficiency and customer satisfaction, but also greatly reducing labor intensity, with significant economic and social benefits.

It is to be understood that both the foregoing general description and the following detailed description are exemplary and explanatory only and are not intended to limit the present application.

DETAILED DESCRIPTION OF THE EMBODIMENTS

Technical solutions of the present application will be described clearly and completely below in conjunction with specific embodiments. It should be understood by those skilled in the art that the embodiments described below are only for illustrating the present application and should not be construed as limiting the scope of the present application. All other embodiments obtained by those of ordinary skill in the art based on the embodiments in the present application without creative efforts shall fall within the protection scope of the present application.

The preferred embodiments of the present application will be described in detail below in connection with examples. It is to be understood that the following embodiments are given for illustrative purposes only and are not intended to limit the scope of protection of the present application. Those skilled in the art can make various modifications and substitutions to the present application without departing from the conception of the present application, and all such modifications and substitutions fall within the scope of protection claimed in the claims of the present application.

Although the present application is described in detail with the general description above and the specific embodiments below, it is obvious to those skilled in the art that some modifications or improvements can be made on the basis of the present application, and thus these modifications or improvements made without departing from the concept of the present application belong to the scope of protection of the present application.

Figure 1:
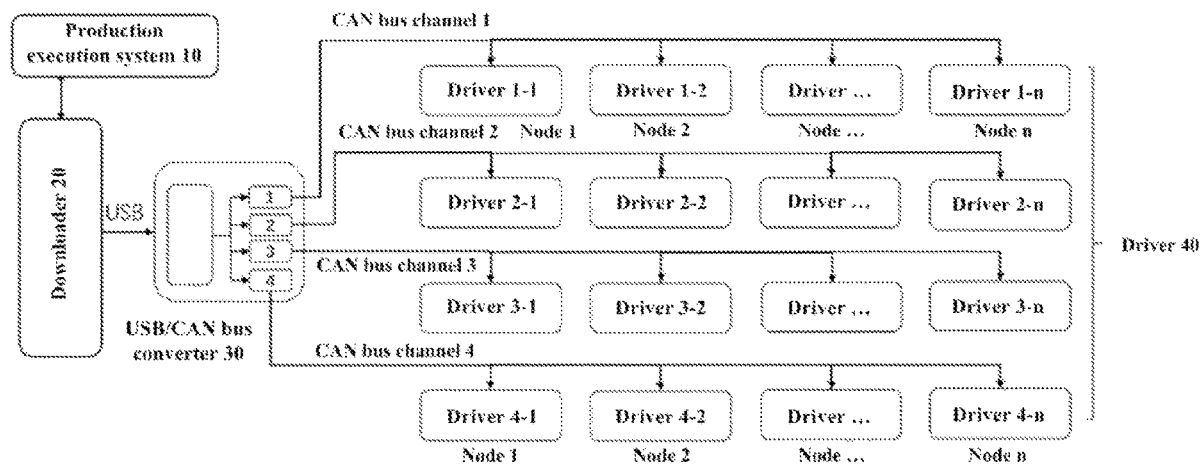
FIG. 1 is a structural block diagram of a system for downloading application program of industrial electric vehicle driver according to an exemplary embodiment.

The present application will be further described below in conjunction with the accompanying drawings and embodiments:

In a first aspect, as shown in FIG. 1, an embodiment of the present application provides a system for downloading application program of industrial electric vehicle driver, including: a downloader 20, a USB/CAN bus converter 30 and a plurality of drivers 40; where the downloader 20 is connected to a production execution system 10 and the USB/CAN bus converter 30, respectively, the USB/CAN bus converter 30 has a plurality of CAN bus channels, each of the CAN bus channels comprises a plurality of nodes, and each of the nodes is provided with the corresponding driver.

The downloader 20 is configured to sequentially scan the drivers on each node under all CAN bus channels of the USB/CAN bus converter, and obtain a serial number stored in each of the drivers; automatically match a corresponding application program file from the production execution system according to the serial number of the driver; load the application program file and extract application program data from the application program file; create and issue a first command data frame of data domain process to a corresponding driver, and initialize a download identification; create and issue a second command data frame of upload/download mode to a corresponding driver; create and issue a third command data frame of data address record to a corresponding driver; create a fourth data frame of application program; create and issue a fifth command data frame of ending data frame to a corresponding driver when the application program is downloaded completely; create and issue a sixth command data frame of ending data domain process to a corresponding driver, and reset the download identification; and create and issue a seventh command data frame of restarting node to a corresponding driver to allow the downloaded application program in the driver to take effect.

It should be noted that in this embodiment, the downloader and the USB/CAN bus converter are connected through a USB interface, and the USB/CAN bus converter has multiple CAN bus channels, such as 2 channels, 3 channels or 4 channels; certainly, other numbers of channels may also be adopted, which are not specifically limited here. In this embodiment, each CAN bus channel has multiple nodes, and each node is provided with a corresponding driver, for instance, the number of nodes may be any one between 2 and 32; certainly, other numbers of nodes may also be adopted, which are not specifically limited here.

In this embodiment, the downloader may be a computer, or other processors, which will not be illustrated one by one here.

In addition, in this embodiment, the downloader is configured to parse and store application program data according to the content of the downloaded file, and is configured with progress display and log record display during the download process. The log record displays events and corresponding operation record information in the current download process in reverse order, and the log record information file is recorded and stored in the format of "DlLogXXXX (yyyy) XX (MM)XX (dd). Log", which may be viewed and analyzed with tools such as Notepad, WordPad or third-party file viewers. In addition, the downloader may, according to the production order issued by the production system, automatically match and obtain the files to be downloaded for the current node, scan the node, select the node, adapt the baud rate, start the download process, and automatically restart the node after the download is completed, so as to allow the downloaded application program to take effect.

In this embodiment, the downloader can select the application program file to be loaded according to the user's needs, and the application program file can be loaded at one time and then can be downloaded repeatedly to various drivers, thereby solving the problems associated with loading the application program files every time, such as excessive loading time and error-prone selection. After download of the application program, the selected node is restarted to allow the downloaded application program to take effect.

In an embodiment, the USB/CAN bus converter 30 in the system for downloading application program of industrial electric vehicle driver has 2 to 4 CAN bus channels. Preferably, the USB/CAN bus converter 30 has 4 CAN bus channels.

In an embodiment, each CAN bus channel in the system for downloading application program of industrial electric vehicle driver includes 2 to 32 nodes. Preferably, each CAN bus channel includes 32 nodes.

In an embodiment, the driver supports CAN and CAN-OPEN protocols in terms of communication protocols.

In an embodiment, the driver stores therein firmware programs, startup programs, serial numbers, models, and material code feature information.

In an embodiment, the driver has a voltage level of 24V to 84V. Preferably, the voltage of the driver is 48V.

In an embodiment, the application program file in the system for downloading application program of industrial electric vehicle driver contains XML, format data and binary format data. It should be noted that the suffix of the application program file in this embodiment is .epf.

To sum up, the system for downloading application program of industrial electric vehicle driver of the embodiments of the present application is structurally simple. The system includes a downloader, a USB/CAN bus converter and a plurality of drivers; where the downloader is connected to a production execution system and the USB/CAN bus converter, respectively, the USB/CAN bus converter has a plurality of CAN bus channels, each of the CAN bus channels includes a plurality of nodes, and each of the nodes is provided with the corresponding driver. The system enables multi-channel and multi-node download of application programs of industrial electric vehicle driver, and is capable of automatically matching and downloading application program files according to orders by the production system, scanning node, adapting baud rate, starting the download program, and automatically restarting the node after the download is completed, so as to allow the downloaded application program to take effect; moreover, the system is capable of visualizing progress display, and displaying and recording download process log. The system supports both CAN and CAN-OPEN protocols, and can obtain various information stored in the driver, such as firmware program, startup program, serial number, model, and material code feature, which facilitates the function integration of the production system. In the system, an application program, once loaded by a downloader at one time, can be downloaded repeatedly to various drivers; in addition, for a single driver, the data domain process is independently created, and the number of data frames, data length and relative start address are issued synchronously, thereby ensuring the integrity and correctness of the data in the downloading process, and overcoming inefficiency of the related art in which download is performed one-by-one serially.

Figure 2:
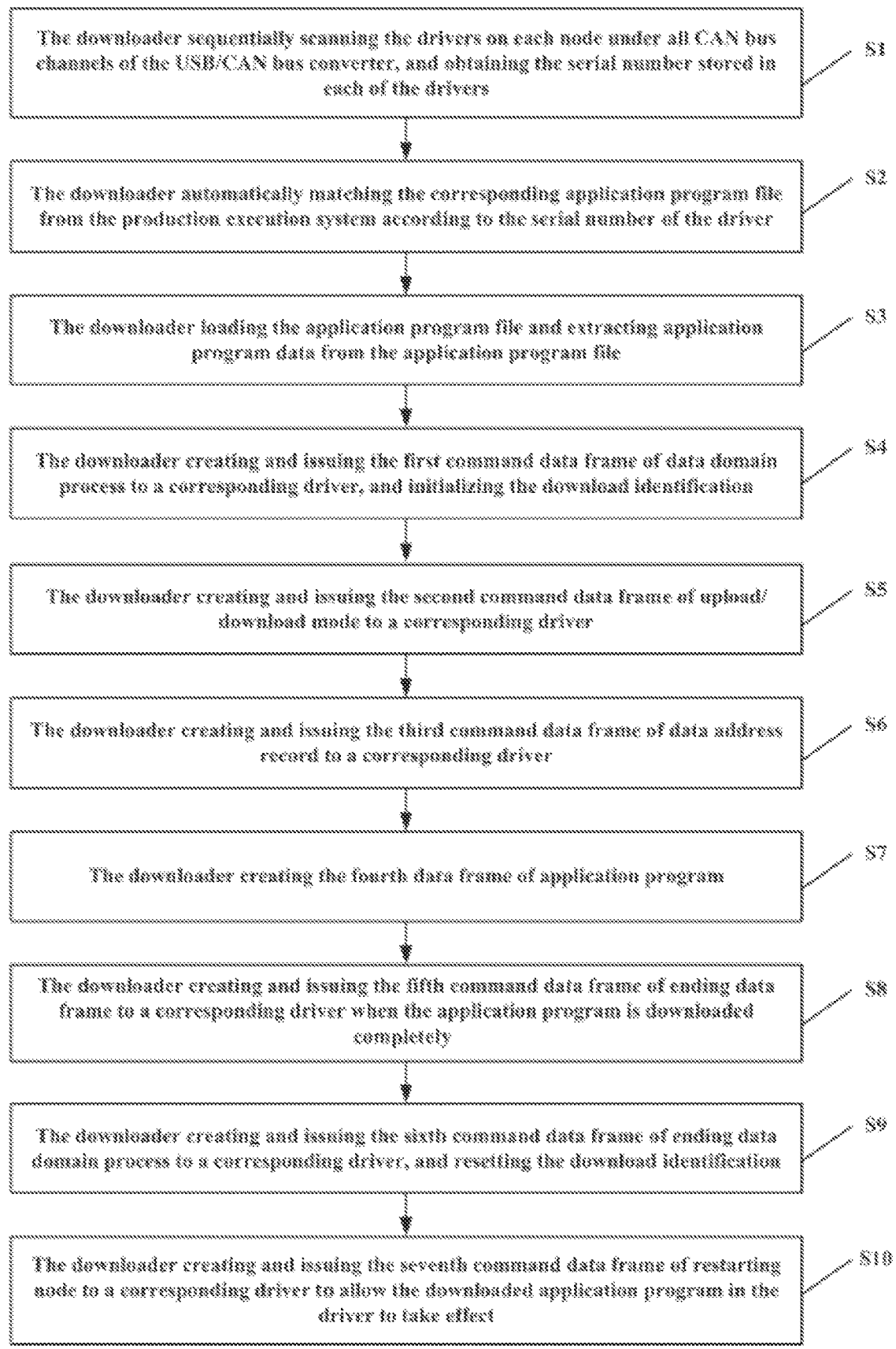
FIG. 2 is a schematic flowchart of a method for downloading application program of industrial electric vehicle driver according to an exemplary embodiment.

In a second aspect, as shown in FIG. 2, an embodiment of the present application provides a method for downloading application program of industrial electric vehicle driver, performed by the system for downloading application program of industrial electric vehicle driver according to the above-mentioned embodiments. The method includes the following steps:

S1, the downloader sequentially scanning the drivers on each node under all CAN bus channels of the USB/CAN bus converter, and obtaining the serial number stored in each of the drivers;

S2, the downloader automatically matching the corresponding application program file from the production execution system according to the serial number of the driver;

S3, the downloader loading the application program file and extracting application program data from the application program file;

S4, the downloader creating and issuing the first command data frame of data domain process to a corresponding driver, and initializing the download identification;

S5, the downloader creating and issuing the second command data frame of upload/download mode to a corresponding driver;

S6, the downloader creating and issuing the third command data frame of data address record to a corresponding driver;

S7, the downloader creating the fourth data frame of application program, wherein a first byte in the fourth data frame of application program is a command identification, a second byte identifies a current process, a third byte identifies a serial number for downloading a current data frame, and last 5 bytes store application program data;

S8, the downloader creating and issuing the fifth command data frame of ending data frame to a corresponding driver when the application program is downloaded completely;

S9, the downloader creating and issuing the sixth command data frame of ending data domain process to a corresponding driver, and resetting the download identification; and S10, the downloader creating and issuing the seventh command data frame of restarting node to a corresponding driver to allow the downloaded application program in the driver to take effect.

In an embodiment, in S1 of the method for downloading application program of industrial electric vehicle driver of the present application, the downloader associates the obtained serial number with a production order issued by the production execution system, and automatically or manually selects a node and a baud rate at which communication can be established, so as to obtain information stored in the driver; the information stored in the driver includes firmware program, startup program, serial number, model and material code feature information.

In an embodiment, in S2 of the method for downloading application program of industrial electric vehicle driver of the present application, the downloader automatically matches the corresponding application program file from the production execution system by means of a database intermediate table or a WebService/WebAPI interface.

In an embodiment, in S3 of the method for downloading application program of industrial electric vehicle driver of the present application, the downloader extracts application program data in binary format from the application program file, parses the application program data in binary format, removes invalid verification data, and saves processed data to a temporary memory in the corresponding downloader.

Figure 3:
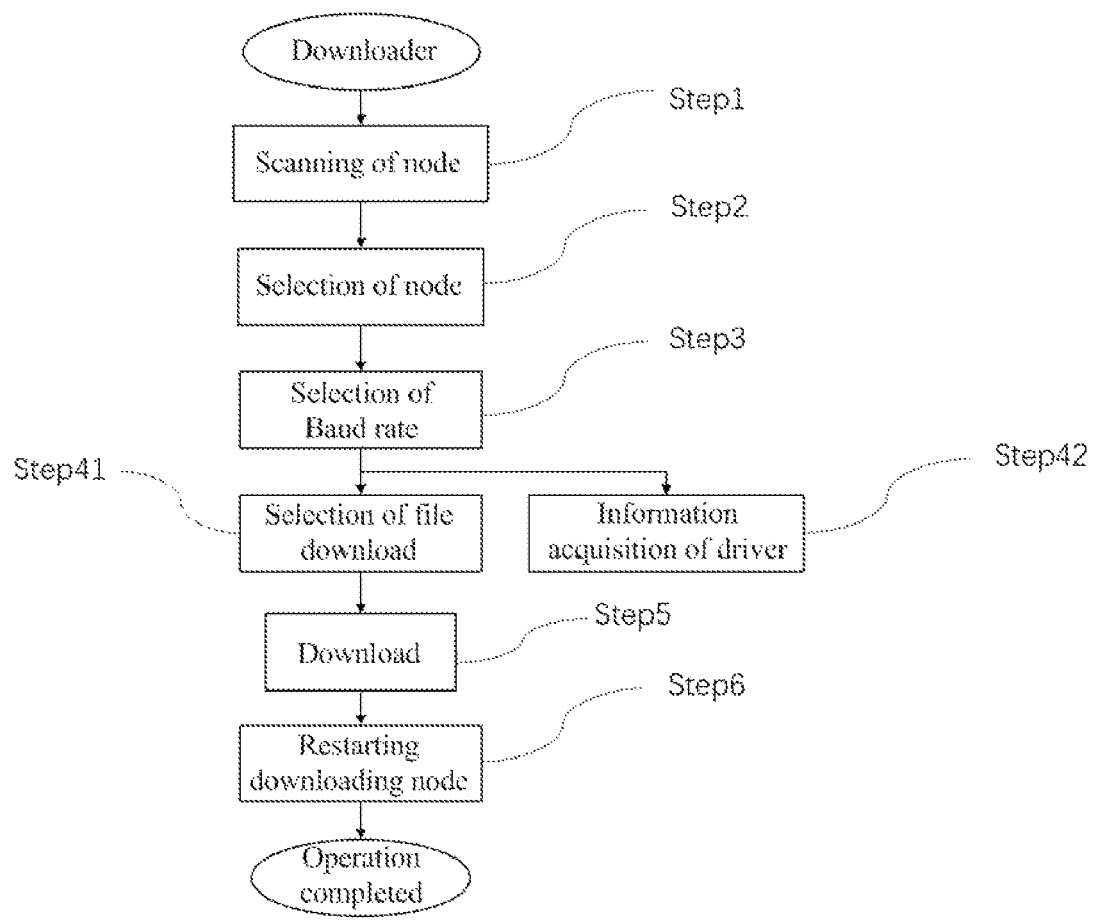
FIG. 3 is a flowchart showing an operation of a downloader in a method for downloading application program of industrial electric vehicle driver according to an exemplary embodiment.

Specifically, as shown in the operation flowchart of the downloader in FIG. 3, The node scanning function can be selected in the downloader as required, the downloader scans node information corresponding to all channels through the CAN bus channel, and loads the node information into a drop-down box of a software interface corresponding to the downloader; the node information is identified as "CAN"+"channel number"+'-'+"node number", for instance, "CAN2-7" represents the seventh node of the second channel of the CAN bus. In addition, the downloader is equipped with a selection drop-down box of communication baud rate, providing baud rate options, such as 83K, 50K, 62K, 100K, 125K, 250K, 500K, 1 M and other baud rate options. In the downloader, the information stored in the driver, such as the boot program (such as 69G21001A07x04), firmware program (69G21003V00x2-AGVPM), serial number (such as S2625775-003), model (such as ACS80S-220C-35P), material code information (such as 83G21356A-001), may be obtained according to the selected node and baud rate, which corresponds to step 42. The downloader can select the application program file to be loaded according to the user's needs, which corresponds to step 41, and the application program file can be repeatedly downloaded to various drivers after it is loaded once, thereby solving the problems associated with loading the application program files every time, such as excessive loading time and error-prone selection. After the download is complete, the selected node can be restarted to allow the downloaded application program to take effect.

Figure 4:
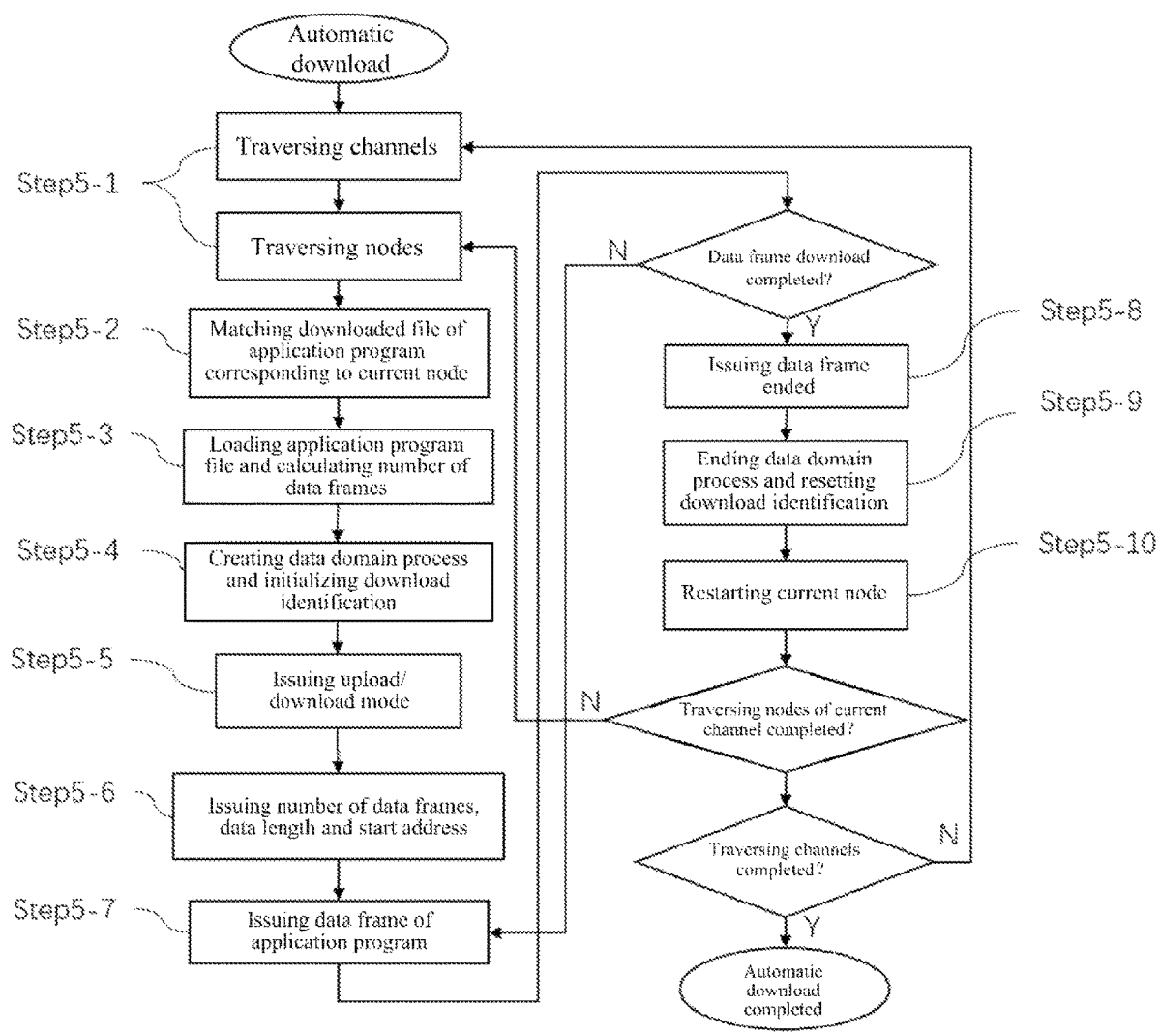
FIG. 4 is a flowchart showing downloading application program with multiple channels and multiple nodes in a method for downloading application program of industrial electric vehicle driver according to an exemplary embodiment.

FIG. 4 is a flowchart showing downloading application program with multiple channels and multiple nodes. The download process shown in FIG. 4 is as follows:

[Step 5-1]: The downloader concurrently traversing all channels of the USB/CAN converter and the nodes corresponding to each channel, where the USB/CAN converter is connected to a USB interface of a downloader computer. The "traversing" refers to scanning sequentially.

[Step 5-2]: The downloader automatically matching and obtaining the application program file corresponding to the current node from the production execution system through the database intermediate table or the Web Service interface; where the application program file is a file containing XML format data and binary format data and having a suffix of .epf; the production execution system is a production execution system or a production line management information system interface-integrated with the downloader, on which a detailed production planning order is generated according to the customer's sales order; the application file corresponding to the serial number of the driver is stored in the production planning order.

The downloader then performing concurrent matching of the application files according to the scanned nodes, extracting the binary data in the application files, and removing the identification and the first check data to obtain the data to be normally downloaded.

[Step 5-3]: The downloader loading the application program file, extracting and parsing the binary data stored therein, removing the first useless check data, and saving the processed data into a corresponding binary byte array.

[Step 5-4]: The downloader creating and issuing the StartDomainSession command data frame of data domain process to the driver corresponding to the node.

The format of this command data frame is:

| B0 | B1 | B2 | B3 | B4 | B5 | B6 | B7 |
|---|---|---|---|---|---|---|---|
| 5 | Session | 0 | 0 | 0 | 0 | 0 | 0 |

Note:
the "Session" represents a current process.

The downloader defining and initializing a download identification.

[Step 5-5]: The downloader creating and issuing a DmFirmware command data frame of upload/download mode to a driver, where one byte of data identifies whether the command is an upload command or a download command.

The format of this command data frame is:

| B0 | B1 | B2 | B3 | B4 | B5 | B6 | B7 |
|---|---|---|---|---|---|---|---|
| 254 | Session | Dir | 0 | 0 | 0 | 0 | 0 |

Note:
the "Session" represents a current process; the "Dir 0xAA" represents download, and the "0x44" represents upload.

[Step 5-6]: The downloader creating and issuing a DmAddrRec command data frame of data address record to a driver, where one byte identifies the number of data frames, one byte identifies the data length of each frame, and four bytes identify the relative address of the 32-bit data.

The format of this command data frame is:

| B0 | B1 | B2 | B3 | B4 | B5 | B6 | B7 |
|---|---|---|---|---|---|---|---|
| 7 | Session | Nframes | Nlen | a0 | a1 | a2 | a3 |

Note:
the "Session" represents a current process; the "Nframes" represents the number of data frames sent; the "NLen" represents the number of bytes per frame, and the "a0" to "a3" represent a 32-bit relative address.

[Step 5-7]: The downloader creating a DmRec data frame of application program, where one byte identifies a current serial number, and 5 bytes store the application program data.

The format of this command data frame is:

| B0 | B1 | B2 | B3 | B4 | B5 | B6 | B7 |
|---|---|---|---|---|---|---|---|
| 6 | Session | Sequ | p0 | p1 | p2 | p3 | p4 |

Note:
the "Session" represents a current process; the "Sequ" represents a current sequence, with a value range of 1-255; the "p0" to "p4" represent the downloaded 5-byte application program data.

[Step 5-8]: The downloader creating and issuing a DmEndRec command data frame of ending data frame to a driver after completing download of the application program data frame.

The format of this command data frame is:

| B0 | B1 | B2 | B3 | B4 | B5 | B6 | B7 |
|---|---|---|---|---|---|---|---|
| 8 | Session | 0 | 0 | 0 | 0 | 0 | 0 |

Note:
the "Session" represents a current process.

[Step 5-9]: The downloader creating and issuing a End-Session command data frame of ending data domain process to a driver, and resetting the download identification.

The format of this command data frame is:

| B0 | B1 | B2 | B3 | B4 | B5 | B6 | B7 |
|---|---|---|---|---|---|---|---|
| 4 | Session | 0 | 0 | 0 | 0 | 0 | 0 |

Note:
the "Session" represents a current process.

[Step 5-10]: The downloader creating and issuing a StartApp command data frame of restarting node to a driver, to allow the previously downloaded application program to take effect.

The format of this command data frame is:

| B0 | B1 | B2 | B3 | B4 | B5 | B6 | B7 |
|---|---|---|---|---|---|---|---|
| 16 | 0 | 0 | 0 | 0 | 0 | 0 | 0 |

For the command data frame in the steps 5-6, 5-8, 5-9 or 5-10, the driver responds to the downloader with an ACK data frame after receiving a correct command data frame issued by the downloader in the steps 5-6, 5-8, 5-9 or 5-10, and the driver responds to the downloader with a NACK data frame after receiving an incorrect command data frame issued by the downloader in the steps 5-6, 5-8, 5-9 or 5-10.

The format of the ACK command data frame is:

| B0 | B1 | B2 | B3 | B4 | B5 | B6 | B7 |
|---|---|---|---|---|---|---|---|
| 3 | Session | 0 | 0 | 0 | 0 | 0 | 0 |

The format of the NACK command data frame is:

| B0 | B1 | B2 | B3 | B4 | B5 | B6 | B7 |
|---|---|---|---|---|---|---|---|
| 2 | Session | Reason | Info | 0 | 0 | 0 | 0 |

Note:
the "Session" represents a current process; the "Reason" represents a cause of the error; the "Info" represents additional information of the reason.

The codes for the reason of error are as follows:

| Code | Meaning of code |
|---|---|
| 0 | Operation not supported |
| 1 | No corresponding activated session |
| 2 | No session available |
| 3 | Bus busy |
| 4 | Serial number lost |
| 5 | Invalid address |
| 6 | Other errors |
| 7 | Excessive data frames |

Regarding the above-mentioned data frame, each frame of data includes 8 bytes of data, and the data frame is classified into a command data frame and an application data frame. 3 bytes of the data frame contain control information, 5 bytes thereof contain data information, and the first byte of the 3-byte control information identifies the command format of the data frame.

In a third aspect of the present application, provided herein is an electronic device, including a memory and a processor, wherein, a computer program is stored on the memory, and when the computer program is executed by the processor, the method for downloading application program of industrial electric vehicle driver according to the above-mentioned embodiments is performed.

In a fourth aspect of the present application, provided herein is a storage medium, wherein a computer program stored in the storage medium can be executed by one or more of the processors, so as to implement the method for downloading an application program of an industrial electric vehicle driver according to the above-mentioned embodiments.

It is understood by those of ordinary skill in the art that all or part of the steps in the various methods of the above-mentioned embodiments can be completed by instructing relevant hardware through a program, and the program can be stored in a computer-readable storage medium, which may include: flash disk, read-only memory (ROM), random access memory (RAM), magnetic disk, compact disk, and the like.

What is claimed is:

1. A system for downloading an application program of an industrial electric vehicle driver, comprising: a downloader, a USB/CAN bus converter and a plurality of drivers; wherein the downloader is connected to a production execution system and the USB/CAN bus converter, respectively, the USB/CAN bus converter has a plurality of CAN bus channels, each of the CAN bus channels comprises a plurality of nodes, and each of the nodes is provided with a driver of the plurality of drivers;

wherein the downloader is configured to:
sequentially scan the drivers on each node under the plurality of CAN bus channels of the USB/CAN bus converter, and obtain a serial number stored in each of the drivers;
automatically match an application program file from the production execution system according to the serial number of each of the drivers;
load the application program file and extract application program data from the application program file;
create and issue a first command data frame of a data domain process to a first driver, and initialize a download identification;
create and issue a second command data frame of upload/download mode to a second driver;
create and issue a third command data frame of a data address record to a third driver;

create a fourth data frame of an application program;

create and issue a fifth command data frame of ending a data frame to a fourth driver when the application program is downloaded completely;

create and issue a sixth command data frame of ending the data domain process to a fifth driver, and reset the download identification; and create and issue a seventh command data frame of restarting node to a sixth driver to allow the application program downloaded in the sixth driver to take effect.

2. The system of claim 1, wherein the USB/CAN bus converter has 2 to 4 CAN bus channels.

3. The system of claim 1, wherein each of the CAN bus channels comprises 2 to 32 nodes.

4. The system of claim 1, wherein the driver supports CAN protocol and CAN-OPEN protocol in terms of communication protocols.

5. The system of claim 4, wherein the driver has a voltage level of 24V to 84V.

6. The system of claim 1, wherein the application program file contains XML format data and binary format data.

7. A method for downloading an application program of an industrial electric vehicle driver, performed by the system for downloading the application program of the industrial electric vehicle driver of claim 1, comprising:

step 1, the downloader sequentially scanning the drivers on each node under the plurality of CAN bus channels of the USB/CAN bus converter, and obtaining the serial number stored in each of the drivers;

step 2, the downloader automatically matching the application program file from the production execution system according to the serial number of each of the drivers;

step 3, the downloader loading the application program file and extracting application program data from the application program file;

step 4, the downloader creating and issuing the first command data frame of the data domain process to the first driver, and initializing the download identification;

step 5, the downloader creating and issuing the second command data frame of upload/download mode to the second driver;

step 6, the downloader creating and issuing the third command data frame of the data address record to the third driver;

step 7, the downloader creating the fourth data frame of the application program, wherein a first byte in the fourth data frame of the application program is a command identification, a second byte in the fourth data frame of the application program identifies a current process, a third byte in the fourth data frame of the application program identifies a serial number for downloading a current data frame, and last 5 bytes in the fourth data frame of the application program store the application program data;

step 8, the downloader creating and issuing the fifth command data frame of ending the data frame to the fourth driver when the application program is downloaded completely;

step 9, the downloader creating and issuing the sixth command data frame of ending the data domain process to the fifth driver, and resetting the download identification; and step 10, the downloader creating and issuing the seventh command data frame of restarting node to the sixth driver to allow the application program downloaded in the sixth driver to take effect.

8. The method of claim 7, wherein the step 1 further comprises: the downloader associating the serial number with a production order issued by the production execution system, and automatically or manually selecting a node and a baud rate to obtain information stored in the driver, wherein communication is established at the baud rate, and the information stored in the driver comprises firmware program, startup program, serial number, model and material code feature information.

9. The method of claim 8, wherein the step 2 further comprises: the downloader automatically matching a corresponding application program file from the production execution system by a database intermediate table or a WebService/WebAPI interface.

10. The method of claim 9, wherein the step 3 further comprises: the downloader extracting application program data in a binary format from the application program file, parsing the application program data in the binary format and removing invalid verification data to obtain processed data, and saving the processed data to a temporary memory in the downloader.

11. The method of claim 7, wherein in the system, the USB/CAN bus converter has 2 to 4 CAN bus channels.

12. The method of claim 7, wherein in the system, each of the CAN bus channels comprises 2 to 32 nodes.

13. The method of claim 7, wherein in the system, the driver supports CAN protocol and CAN-OPEN protocol in terms of communication protocols.

14. The method of claim 13, wherein in the system, the driver has a voltage level of 24V to 84V.

15. The method of claim 7, wherein in the system, the application program file contains XML format data and binary format data.

* * * * *

UNITED STATES PATENT AND TRADEMARK OFFICE
CERTIFICATE OF CORRECTION

PATENT NO. : 11,778,042 B2  
APPLICATION NO. : 17/964066  
DATED : October 3, 2023  
INVENTOR(S) : Zhang et al.

Page 1 of 1

It is certified that error appears in the above-identified patent and that said Letters Patent is hereby corrected as shown below:

On the Title Page

Left column, between item (65) and (51), insert:
-- (30) Foreign Application Priority Data
Dec. 17, 2021 (CN) ..................... 202111547937.7 --

Signed and Sealed this
Twenty-seventh Day of August, 2024

Katherine Kelly Vidal
*Director of the United States Patent and Trademark Office*